United States Patent [19]

Ashi et al.

[11] Patent Number: 5,271,006
[45] Date of Patent: Dec. 14, 1993

[54] FRAME ALIGNER AND METHOD AND SYSTEM FOR CONTROL THEREOF

[75] Inventors: Yoshihiro Ashi; Tadayuki Kanno, both of Yokohama; Masahiro Takatori, Kokubunji; Hiromi Ueda, Tokyo, all of Japan

[73] Assignees: Hitachi, Ltd.; Nippon Telegraph and Telephone Corporation, both of Tokyo, Japan; a part interest

[21] Appl. No.: 663,956
[22] PCT Filed: Jul. 18, 1990
[86] PCT No.: PCT/JP90/00925
  § 371 Date: Mar. 19, 1991
  § 102(e) Date: Mar. 19, 1991
[87] PCT Pub. No.: WO91/01601
  PCT Pub. Date: Feb. 7, 1991
[51] Int. Cl.$^5$ .............................................. H04J 3/22
[52] U.S. Cl. ...................................... 370/84; 370/106; 370/105.1
[58] Field of Search ............... 370/84, 106, 112, 105.1, 370/102, 94.1, 60, 58.1, 100.1; 375/118, 114, 111

[56] References Cited

U.S. PATENT DOCUMENTS

| | | | |
|---|---|---|---|
| 4,229,815 | 10/1980 | Cummiskey | 370/84 |
| 4,230,911 | 10/1980 | Fellinger et al. | 370/106 |
| 4,368,531 | 1/1983 | Chopping | 375/118 |
| 4,535,446 | 8/1985 | Mountain | 370/84 |
| 4,872,073 | 10/1989 | Fincher et al. | 370/84 |
| 4,873,684 | 10/1989 | Kobayashi et al. | 370/84 |
| 4,884,264 | 11/1989 | Servel et al. | 370/60 |
| 4,905,228 | 2/1990 | Angell et al. | 370/84 |
| 4,914,655 | 4/1990 | Johannes et al. | 370/112 |
| 4,947,388 | 8/1990 | Kuxahara et al. | 370/60 |
| 5,128,939 | 7/1992 | Takatori et al. | 370/105.1 |

FOREIGN PATENT DOCUMENTS

| | | |
|---|---|---|
| 0231590 | 12/1987 | European Pat. Off. . |
| 0323248 | 5/1989 | European Pat. Off. . |
| 6150435A | 8/1984 | Japan . |
| 2066627 | 8/1981 | United Kingdom . |

Primary Examiner—Douglas W. Olms
Assistant Examiner—Dang Ton
Attorney, Agent, or Firm—Antonelli, Terry, Stout & Kraus

[57] ABSTRACT

A frame aligner and a method and system for control thereof, in which the frame alignment is executed while assuring TSSI (Time Slot Sequence Integrity). In a system for transmitting a plurality of low-speed signals having a frame structure in a high-speed frame, a plurality of candidates for a write start phase for a frame aligner memory are set, and by accessing a common phase memory storing a write start phase shared by low-speed signals requiring phase matching therebetween of all the low-speed signals stored in the high-speed frame, a write start phase is selected from among the candidates for the write start phase for the frame aligner memory.

22 Claims, 11 Drawing Sheets

TIME-DIVISION BYTE MULTIPLEXING

FIG. 4

TRANSMISSION PATH

RECEIVING SIDE

FIG. 5

TRANSMISSION PATH

RECEIVING SIDE

FIG. 6
FRAME MEMORY

| STATE | | INDIVIDUAL PHASE MEMORY | COMMON PHASE MEMORY |
|---|---|---|---|
| SLIP | MEMORY CONTENTS | | |
| NON-OCCURRENCE | COINCIDENT | NOT CHANGED | NOT CHANGED |
| NON-OCCURRENCE | NON-COINCIDENT | CONTENTS TRANSFERRED FROM COMMON PHASE MEMORY | NOT CHANGED |
| OCCURRENCE | COINCIDENT | NEWLY SET | NEWLY SET |
| OCCURRENCE | NON-COINCIDENT | CONTENTS TRANSFERRED FROM COMMON PHASE MEMORY | NOT CHANGED |

FIG. 10
(AT TIME OF SLIP OCCURRENCE)

FIG. 11
(ON NORMAL OCCASION)

FIG. 13

| | INDIVIDUAL PHASE MEMORY | REFERENCE MEMORY |

| STATE | | INDIVIDUAL PHASE MEMORY |
|---|---|---|
| SLIP | MEMORY CONTENTS | |
| NON-OCCURRENCE | COINCIDENT | NOT CHANGED |
| NON-OCCURRENCE | NON-COINCIDENT | CONTENTS TRANSFERRED FROM THE REFERENCED INDIVIDUAL PHASE MEMORY TO OWN INDIVIDUAL PHASE MEMORY |
| OCCURRENCE | COINCIDENT | NEWLY SET |
| OCCURRENCE | NON-COINCIDENT | CONTENTS TRANSFERRED FROM THE REFERENCED INDIVIDUAL PHASE MEMORY TO OWN INDIVIDUAL PHASE MEMORY |

FIG. 15

FRAME ALIGNER AND METHOD AND SYSTEM FOR CONTROL THEREOF

TECHNICAL FIELD

The present invention relates to a system for transmitting a plurality of low-speed signals having a frame structure within a high-speed frame in multiplex fashion like SONET, or in particular to a frame aligner and a method and system for control suitable for matching the frame phases between the plurality of low-speed signals.

BACKGROUND ART

Conventional systems, as described in Research Applications Report Vol. 28, No. 7, p. 210, Chapter 3.1.1, are known to be of three types including (1) fixed delayed insertion-removal plus frame memory, (2) two-frame memory, and (3) elastic store plus frame memory.

All of these three types of system are such that the phase of writing data into a frame aligner memory (hereinafter referred to as "the frame memory") is compared with the phase of reading the same data, and the approach of one phase to the other is detected thereby to control the writing into the frame memory.

Figure 4:
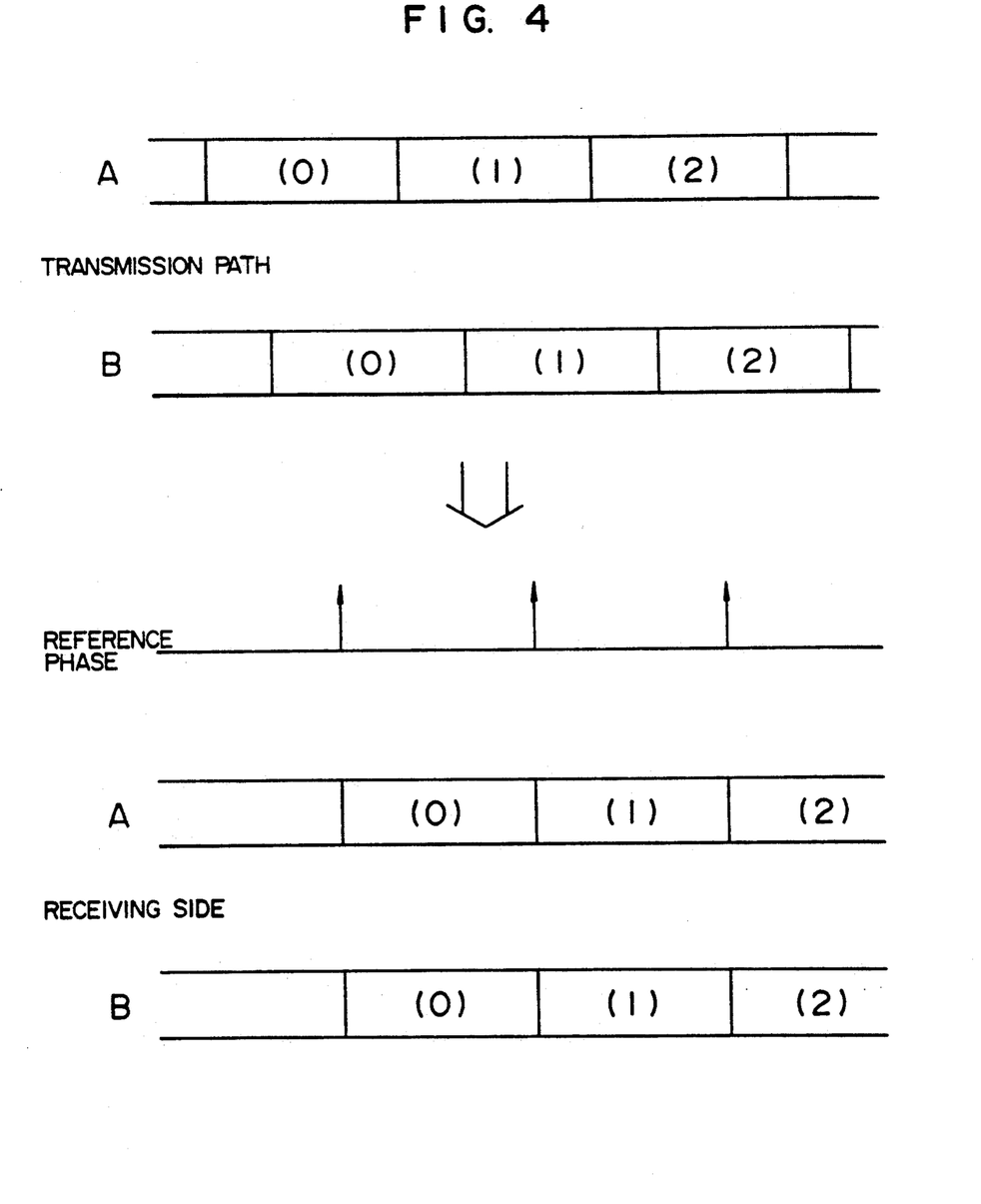
FIG. 4 is a diagram showing a case in which TSSI is capable of being assured.
Figure 5:
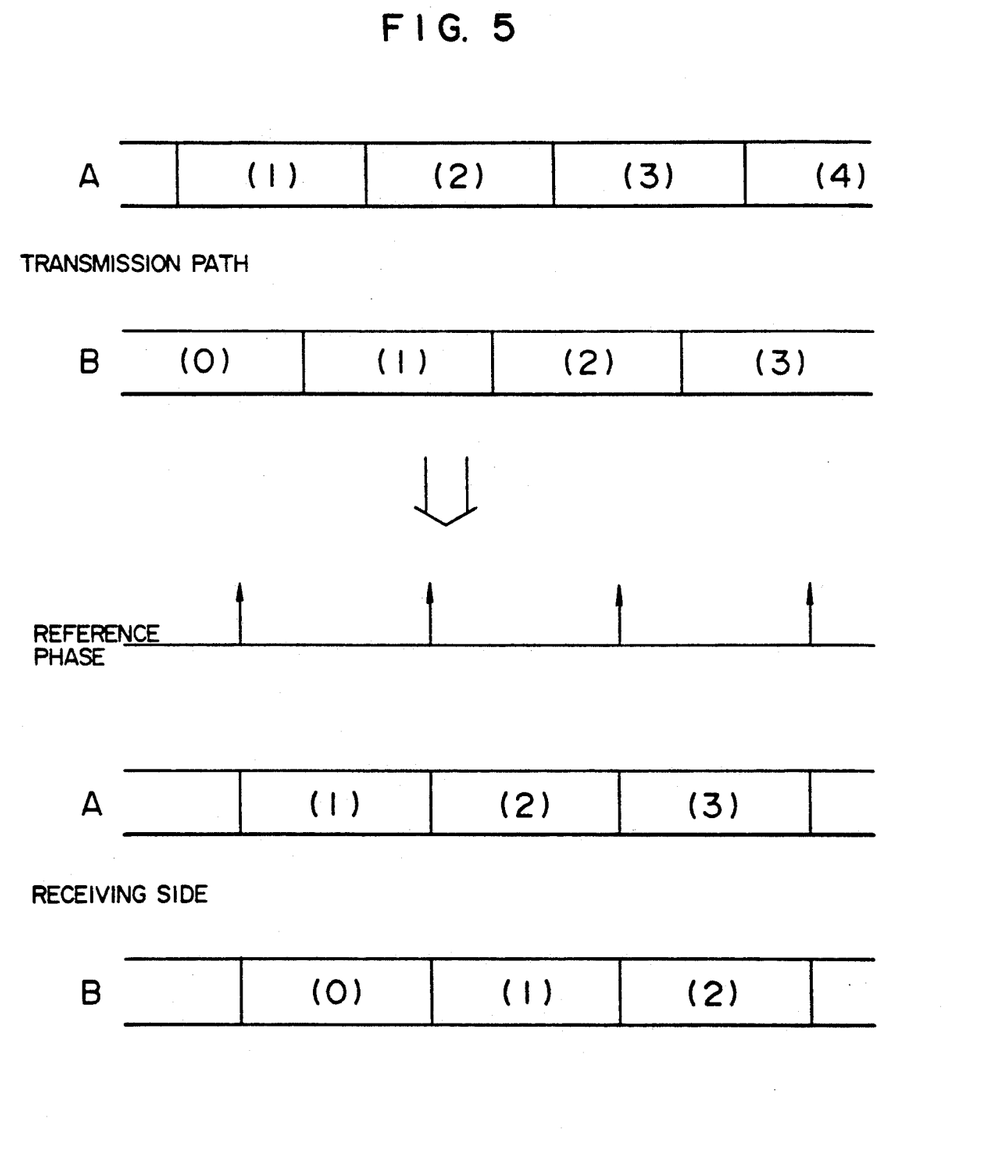
FIG. 5 is a diagram showing a case in which TSSI is incapable of being assured.

In a system for transmitting low-speed signals having a frame structure within a high-speed frame in multiplex fashion, it is necessary to assure the time sequence (hereinafter referred to as "TSSI", an abbreviation of Time Slot Sequence Integrity) by matching the phases between the low-speed signals arriving from the same channel at the time of terminating the high-speed frame. FIG. 4 shows a case in which the TSSI is assured, and FIG. 5 shows a case in which it is not assured. In FIGS. 4 and 5, there are two types of low-speed frames, A and B. The numerical value in each frame indicates the order of generation of the particular frame. The received frames are aligned in accordance with a predetermined reference phase at the receiving end. Now, assume that the TSSIs of A and B are required to coincide with each other at the receiving end, i.e., that the TSSIs of A and B are required to be assured. In such a case, the reference phase must exist at a place where the order of generation of A coincides with that of B as shown in FIG. 4.

Figure 8:
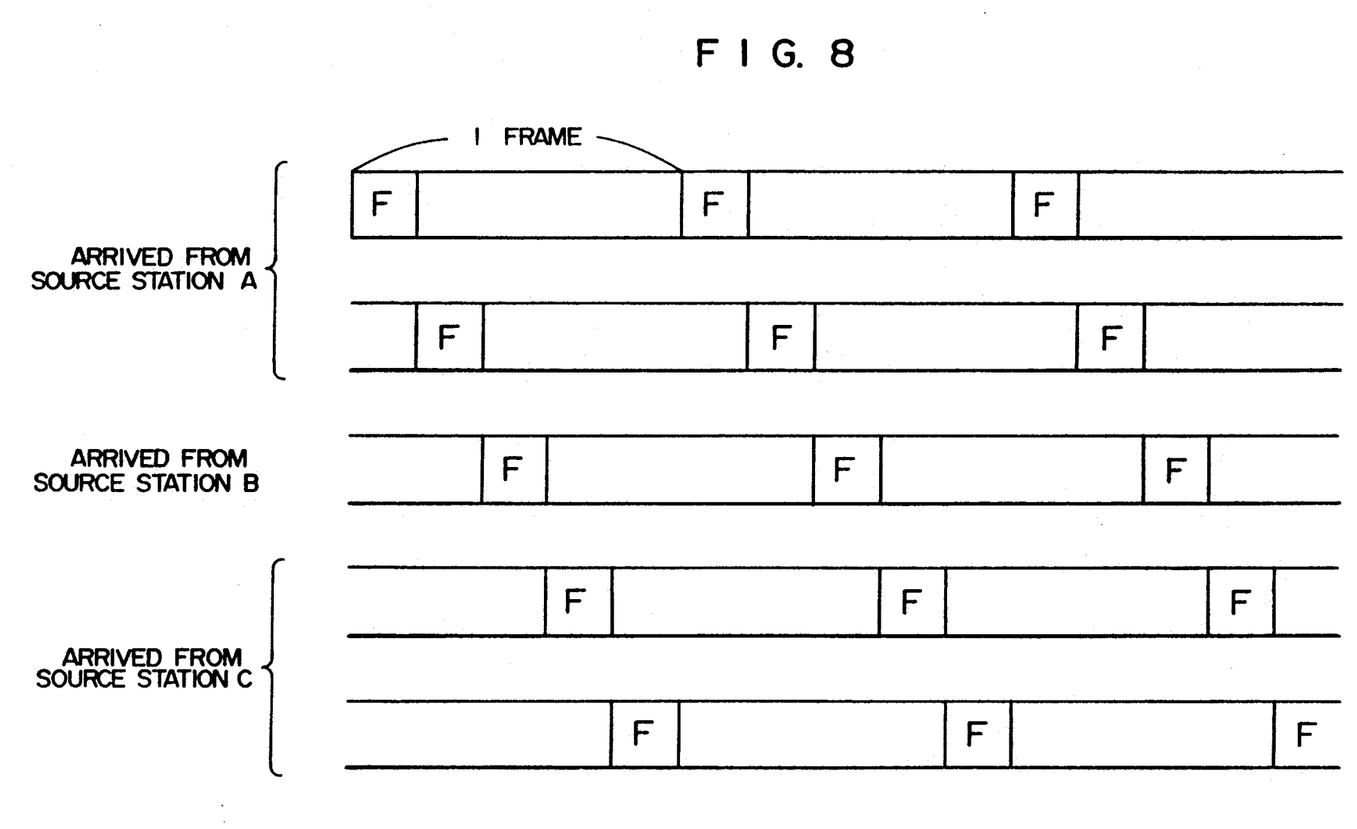
FIG. 8 is a diagram showing a case in which low-speed signals have arrived from a plurality of source stations.

All the conventional systems described above handle only a single frame, so that in terminating the above-mentioned high-speed frames, it is required that each low-speed signal be separated and be subjected to frame alignment individually. As a result, as shown in FIG. 8, in the case where a plurality of low-speed signals to be terminated arrive from a plurality of source stations with the phases thereof distributed over a whole frame, an attempt to assure the TSSI for each of all the source stations would fail as it is impossible to set a reference phase capable of assuring the TSSI for all the source stations.

SUMMARY OF THE INVENTION

Accordingly, an object of the present invention is to provide a frame aligner and a method and system for controlling the same which are capable of executing the frame alignment while assuring the TSSI at the same time.

The above-mentioned object is achieved, according to one aspect of the invention, by setting a plurality of candidates for frame memory write start phase, and providing a memory (hereinafter referred to as "the individual phase memory") for storing a write start phase selected for each low-speed signal stored in a high-speed frame, a memory (hereinafter referred to as "the common phase memory") for storing a write start phase shared by a plurality of low-speed signals among which the TSSI is to be assured, and a memory (hereinafter referred to as "the identification memory") indicating a particular common phase memory that should be referenced.

Also, the above-mentioned object is achieved, according to another aspect of the present invention, by setting a plurality of candidates for frame memory write start phase and providing a memory (hereinafter referred to as "the individual phase memory"), one for each low-speed signal, for storing a write start phase selected for a low-speed signal accommodated in a high-speed frame, a memory (hereinafter referred to as "the reference memory"), one for each low-speed signal, for indicating a particular individual phase memory to be referenced, means for setting the reference memories so that the reference memories reference respective individual phase memories of different mating low-speed signals among a plurality of low-speed signals which are required to be phase-matched to each other, and means for transferring the value of the referenced individual phase memories of the mating low-speed signals to the referencing (own) individual phase memories.

Figure 6:
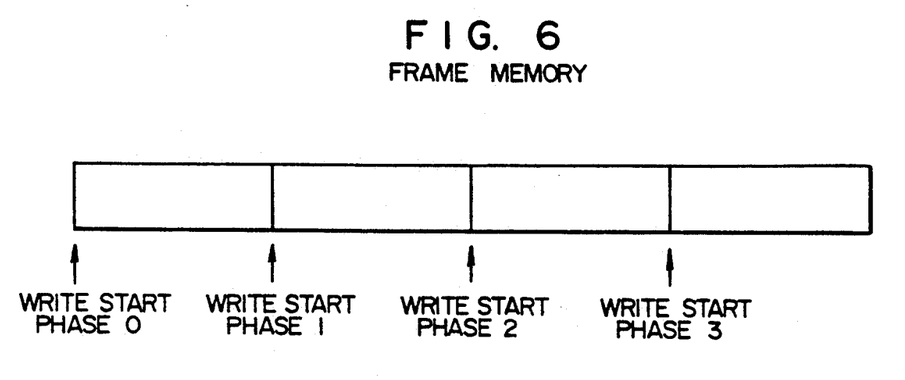
FIG. 6 is a diagram showing the construction of a frame memory.
Figure 7:
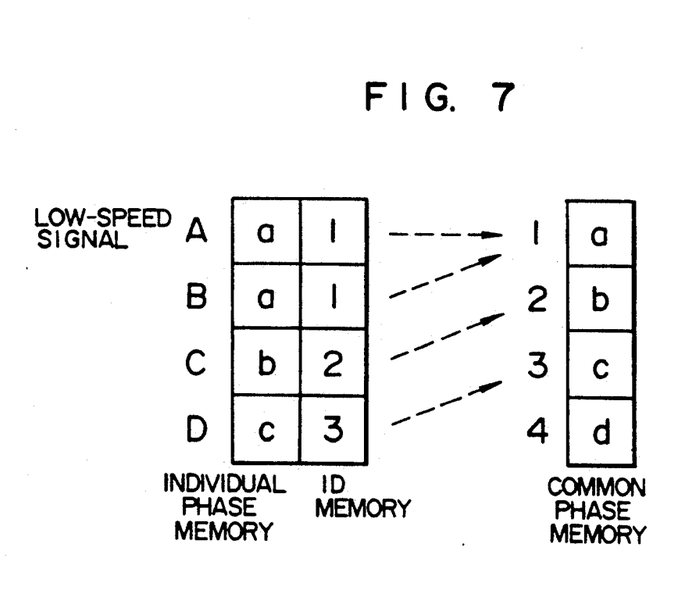
FIG. 7 is a diagram showing the functions of each memory.

According to the present invention, as shown in FIG. 6, a plurality of candidates for write start phase are set in a frame memory beforehand, and there are provided an individual phase memory for storing a write start phase selected for each low-speed signal accommodated in the high-speed frame, a common phase memory for storing a write start phase shared by a plurality of low speed signals among which the TSSI is to be assured, and an identification memory indicating a particular common phase memory which should be referenced. As an example, explanation will be made, with reference to FIG. 7, about a method of setting each of the above-mentioned memories in the case where there exist four types of low-speed signals A, B, C and D, of which the TSSI between the low-speed signals A and B is to be assured. First, the contents of the identification memories of A, B, C and D are set, for example, to 1, 1, 2 and 3, respectively. In setting the individual phase memory of A, for example, first the value of its own identification memory is checked and the value of the common phase memory 1 is referenced and the value (a) of the common phase memory 1 is written into the own individual phase memory. Similarly, in the case of setting the individual phase memory of B, the value of its own identification memory is checked and, the value of the common phase memory 1 is referenced and the value (a) of the common phase memory is written into the own individual phase memory. In the case of setting the individual phase memory of C, the value of the identification memory of C is checked and the value of the common phase memory 2 is referenced and the value (b) of the common phase memory 2 is written into the own individual phase memory. In the case where the individual phase memory of D is set, the value of the identification memory of D is checked and the value of the common phase memory 3 is referenced and the value (c) of the common phase memory 3 is written into the own individual phase memory. As a result, the contents of the individual phase memories of A and B come to coincide with each other, thereby making it possible to set a reference phase, assuring TSSI between A and B without being affected by C or D.

Figure 9:
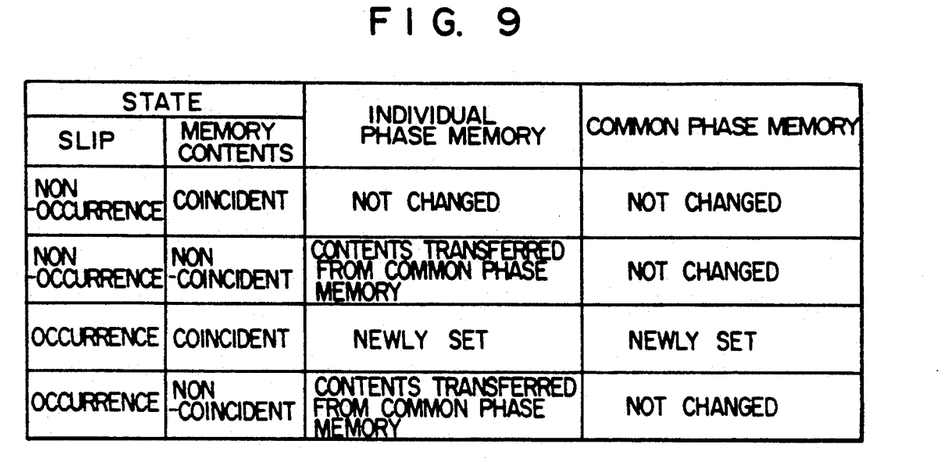
FIG. 9 is a diagram showing the updating operation of each memory.

The following two information are used for updating the contents of the individual phase memory and the common phase memory: One is slip occurrence information, and the other is the result of comparing the contents of the individual phase memory and the common phase memory. The updating operation described in the following is performed on the basis of these two information (See FIG. 9): In the case where the contents of the individual phase memory and the common phase memory are basically different from each other, the contents of the common phase memory are transferred to the individual phase memory. Note however that in the case where a slip occurs and at the same time the contents of the individual phase memory coincide with those of the common phase memory, a new write start phase is selected and stored in the common phase memory and the individual phase memory. The following method is available for selecting a new write start phase: First, it is decided whether the slip that has occurred is due to the approach of the write phase to the read phase (such a slip will hereinafter be referred to as "the forward slip") or due to the approach of the read phase to the write phase (such a slip will hereinafter be referred to as "the rearward slip") thereby to select a new write phase. Specifically, in the case where the current write start phase is 1 in FIG. 6, the write start phase 0 is selected as a new write start phase if the slip that occurred is a forward one. If the slip that occurred is a rearward one, on the other hand, the write start phase 2 is selected as a new write start phase. This selecting operation is easily realizable by adding 1 to or subtracting 1 from the contents of the memories.

The above-mentioned operation permits the frame alignment to be executed while at the same time assuring TSSI between low-speed signals having a frame structure accommodated in a high-speed frame.

Frame alignment may be executed also by the operation described below while assuring TSSI between low-speed signals having a frame structure accommodated in a high-speed frame.

First, as shown in FIG. 6, a plurality of candidates for write start phase are set in a frame memory in advance. There are also provided an individual phase memory for storing the write start phase selected for each low-speed signal accommodated in the high-speed frame and a memory (hereinafter referred to as "the reference memory") indicating a particular individual phase memory to be referenced for each low-speed signal. As an example, explanation will be made with reference to FIG. 13 about a method of setting each memory in the case where there exist four types of low-speed signal, A, B, C and D, of which the TSSI among the low-speed signals A, B and C is to be assured. First, the contents of the reference memories for A, B, C and D are set as 10, 00, 01 and so on. In setting the individual phase memory for A, for example, first the value of its own reference memory is checked and the value of the individual phase memory for C is referenced, so that if the value of this individual phase memory is different from the value of the own individual phase memory, the value of the individual phase memory for C is transferred to the own individual phase memory. In the case of setting the individual phase memory for B, on the other hand, the value of its own reference memory is checked first of all, followed by referencing the value of the individual phase memory for A, so that if the value of the individual phase memory for A is different from the value of the own individual phase memory, the value of the individual phase memory for A is transferred to the own individual phase memory. In setting the individual phase memory for C, first the value of its own access memory is checked, followed by referencing the individual phase memory for B, so that if the value of the individual phase memory for B is different from the value of the own individual phase memory, the value of the individual phase memory for B is transferred to the original individual phase memory. In this way, if mutually-different mating signals are designated among low-speed signals (A, B and C in the case under consideration) requiring TSSI assurance, the contents of the individual phase memories for A, B and C coincide with each other, thereby making it possible to set a reference phase for assuring the TSSI of A, B and C without being affected by D.

Figure 14:
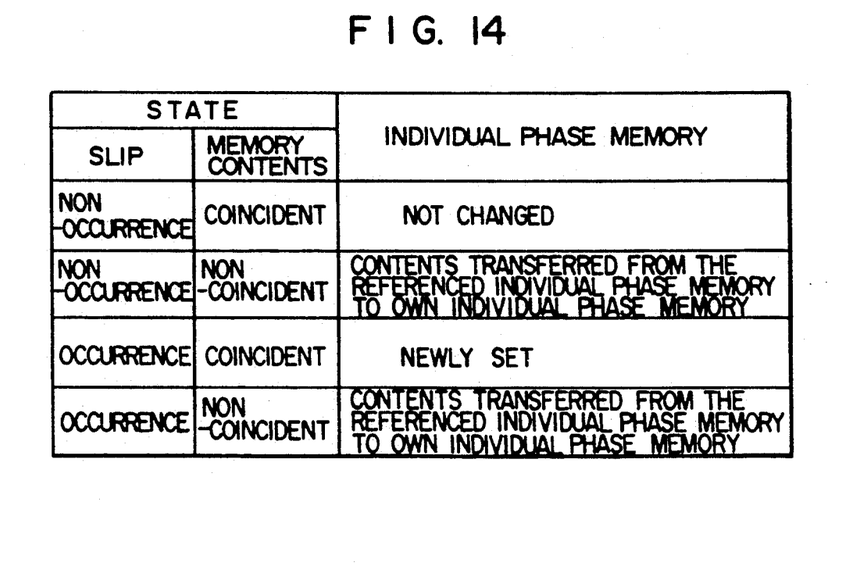
FIG. 14 is a diagram showing the updating operation of each memory used for the second embodiment.

The following two information are used for updating the contents of the individual phase memory and the common phase memory: One is slip occurrence information and the other is the result of comparing the contents of the original individual phase memory with those of the mating individual phase memory designated in the reference memory. The updating operation described in the following is performed on the basis of these two information (See FIG. 14): In the case where the contents of own individual phase memory are basically different from those of the mating individual phase memory designated in the reference memory, the contents of the mating individual phase memory designated in the reference memory are transferred to the own individual phase memory. Note however that in the case where a slip occurs and the contents of the own individual phase memory coincide with those of the mating individual phase memory designated in the reference memory, a new write start phase is selected and stored in the original individual phase memory.

The above-mentioned operation permits the frame alignment to be executed while assuring TSSI among low-speed signals having a frame structure accommodated in a high-speed frame.

BEST MODE FOR CARRYING OUT THE INVENTION

Figure 1:
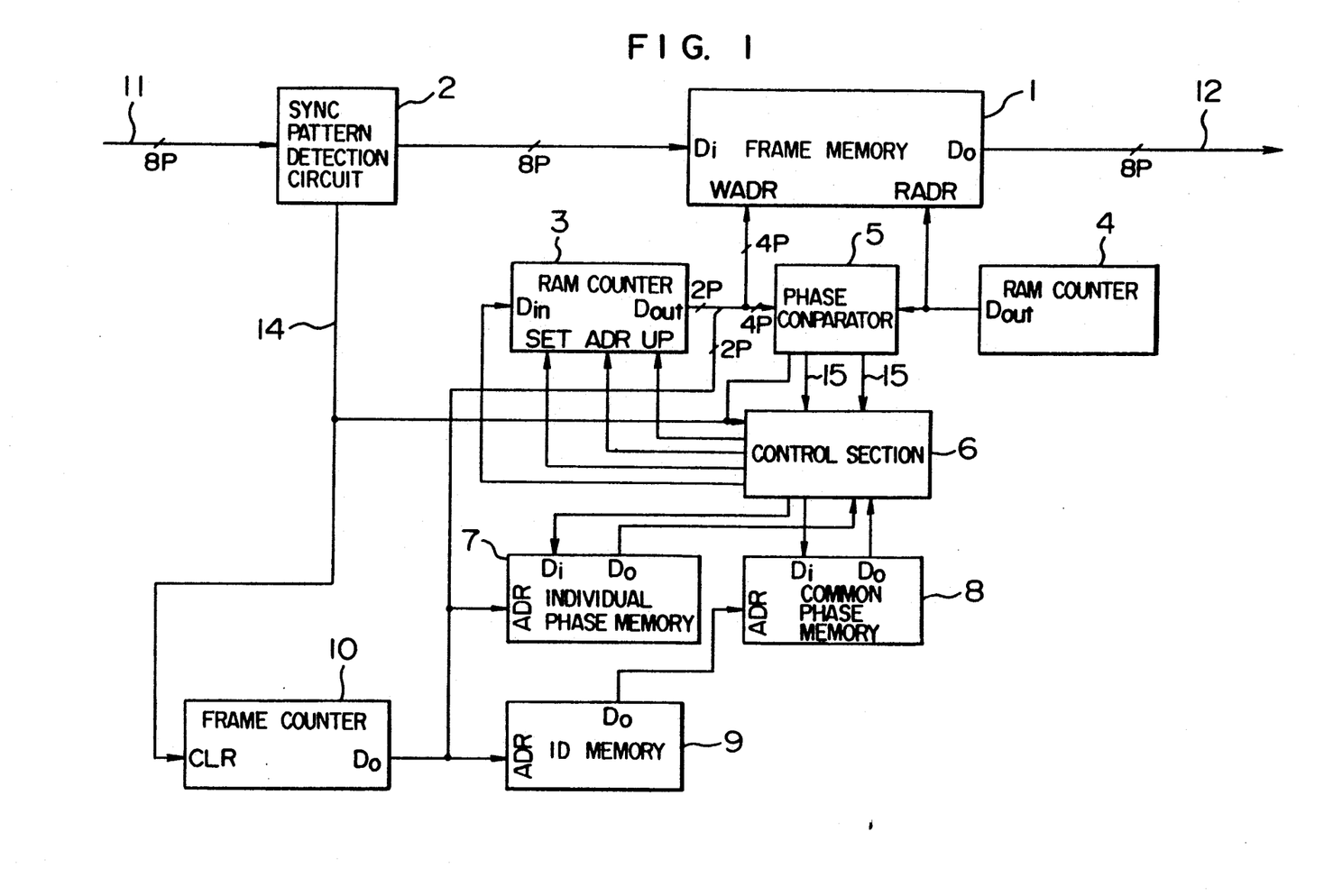
FIG. 1 is a diagram showing a first embodiment of the present invention.
Figure 2:
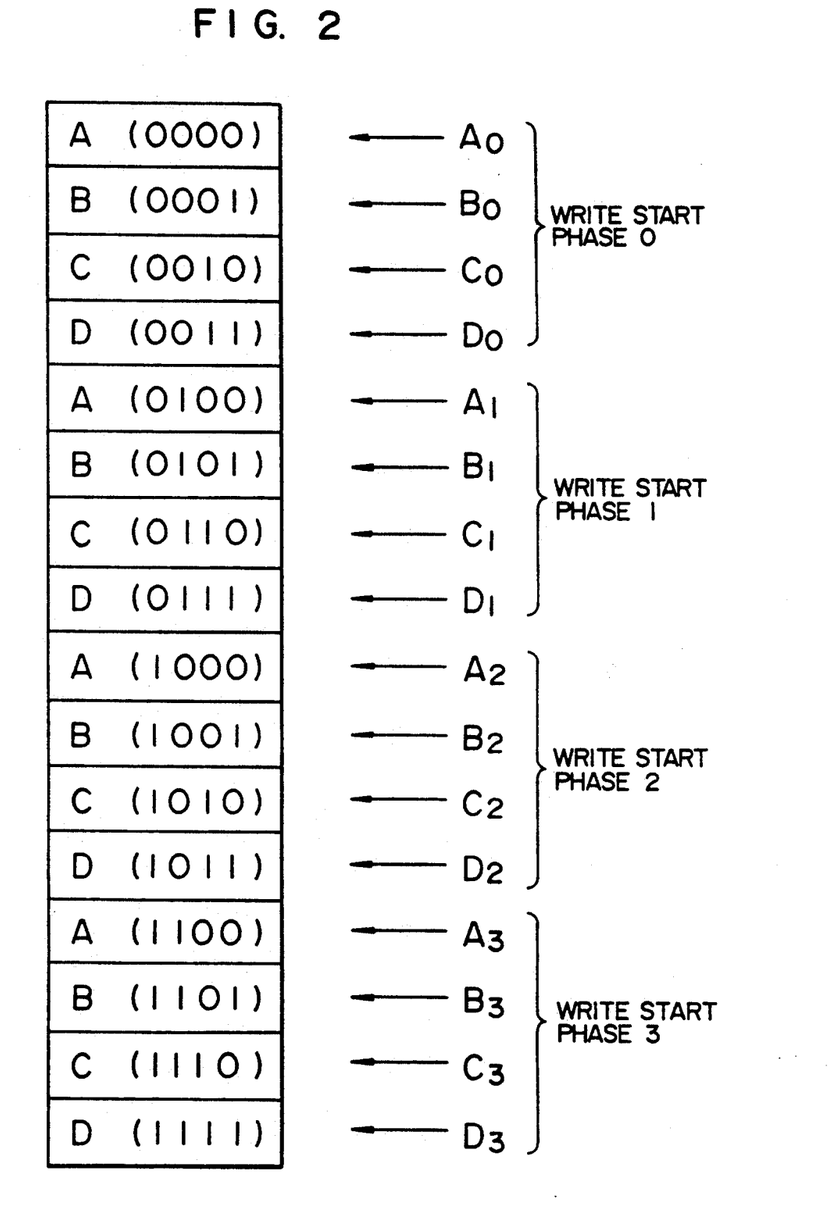
FIG. 2 is a diagram showing the construction of a frame memory used for explaining an embodiment.
Figure 3:
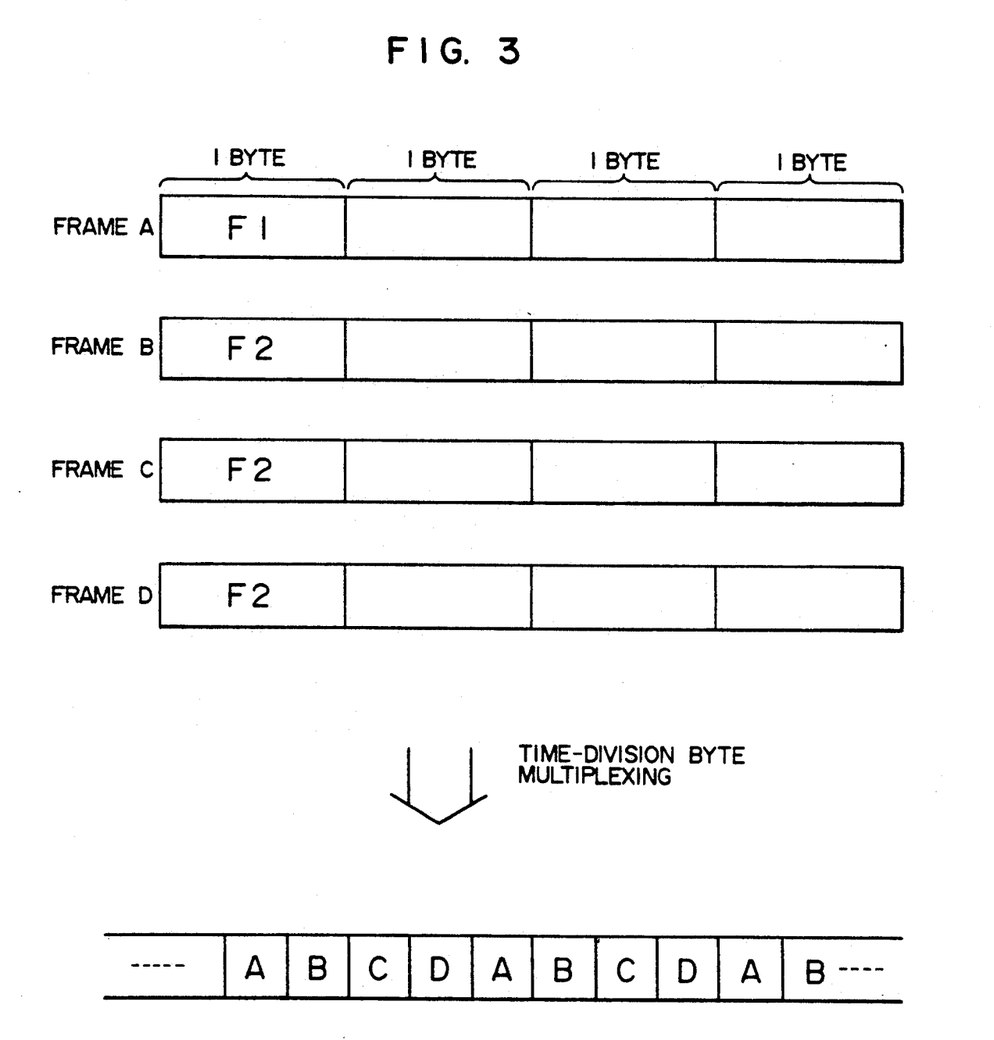
FIG. 3 is a diagram showing a configuration of a frame used for explaining an embodiment.

A first embodiment of the present invention will be explained with reference to FIG. 1. A frame aligner control circuit according to this embodiment is made up of a sync pattern detection circuit 2 for detecting a sync pattern of the data on an incoming highway 11, a frame memory 1 for storing the data on the incoming highway 11, a RAM counter 3 for storing a write address to the frame memory 1 of each low-speed frame, a phase comparator 5 for comparing the read phase with the write phase to detect a slip, a control section 6, an individual phase memory 7 for storing a write start phase selected for each low-speed signal accommodated in a high-speed frame, a common phase memory 8 for storing a write start phase shared by a plurality of low-speed signals for which TSSI is assured, an identification memory 9 indicating a particular common phase memory to be accessed, and a frame counter 10. The RAM counter 3 is one for having a RAM store the condition transition information of a counter corresponding to individual signals and effecting the updating operation thereof by a multiplexing process. There exist four types of low-speed frame A, B, C and D, as shown in FIG. 3. The low-speed frames A, B, C and D are multiplexed in bytes in that order for transmission. Each frame has a length of four bytes. Signals are assumed to be transmitted by being developed in eight parallels on the incoming highway 11. A sync pattern F1 (1 byte) is arranged at the head of frame A, and a sync pattern F2 (1 byte) at the heads of the frames B, C and D, respectively, so that in the case where the sync pattern detection circuit detects F1, the frame counter is cleared. The frame memory is configured as shown in FIG. 2 and has a capacity equivalent to one low-speed frame. There are four types of write start phase 0, 1, 2 and 3. The address of each block is as shown in the parentheses of FIG. 2 from 0000 to 1111. The two least significant bits of the address correspond to the type of each low-speed frame. Specifically, A is associated with 00, B with 01, C with 10 and D with 11.

In accordance with the value of the frame counter 10, the addresses for A, B, C and D are applied to the individual phase memory 7 and the identification memory 9 (the addresses of the individual phase memory 7 and the identification memory 9 corresponding to A, B, C and D are assumed to be 00, 01, 10 and 11, respectively). The identification memory has the address of the common phase memory 8 to be referenced for each low-speed frame, and the value of the address designated in the identification memory 9 is applied to the address of the common phase memory 8. Thus the control section 6 is capable of knowing the value of the individual phase memory 7 and that of the common phase memory 8 for each low-speed frame. Further, the contents of the individual phase memory 7 and the common phase memory 8 are updated in accordance with the operation of FIG. 9 on the basis of the slip occurrence information detected by the phase comparator 5. More specifically, in the case where the value of the common phase memory 8 is different from that of the individual phase memory 7, the value of the common phase memory 8 is transferred to the individual phase memory 7. Also, even in the case where the value of the common phase memory 8 coincides with that of the individual phase memory 7, a new write start phase is selected and stored in the common phase memory 8 and the individual phase memory 7, if a slip occurs. At the time of slip occurrence, the phase comparator 5 decides whether the particular slip has occurred due to the approach of the write phase to the read phase (such a slip will hereinafter be referred to as "the forward slip") or due to the approach of the read phase to the write phase (such a slip will hereinafter be referred to as "the rearward slip") thereby to select a new write phase. Specifically, in the case where the current write start phase is 1 in FIG. 2, the write start phase 0 is selected as a new write start phase if the slip that has occurred is a forward one. If the slip that has occurred is a rearward one, on the other hand, the write start phase 2 is selected as a new write start phase. This operation of selection is executed by adding 1 to or subtracting 1 from the contents of a memory. In this case, the addition or subtraction is an operation using the total number of write start phases (4 in the present embodiment) as a modulo.

Figure 10:
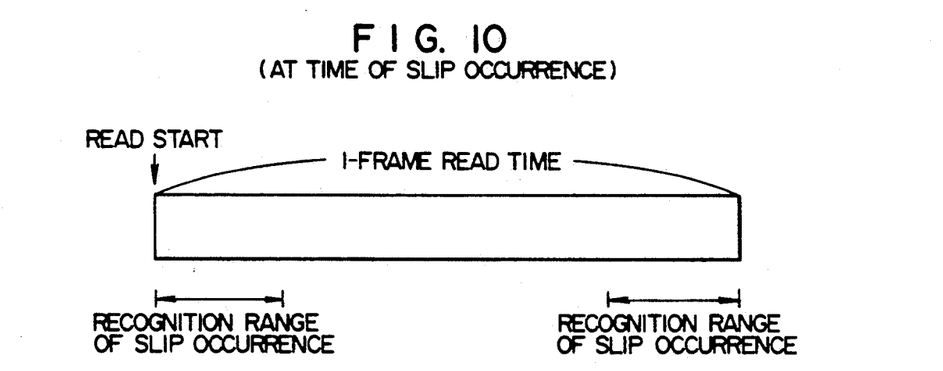
FIG. 10 is a diagram showing conditions for slip occurrence decision at the time of slip occurrence.
Figure 11:
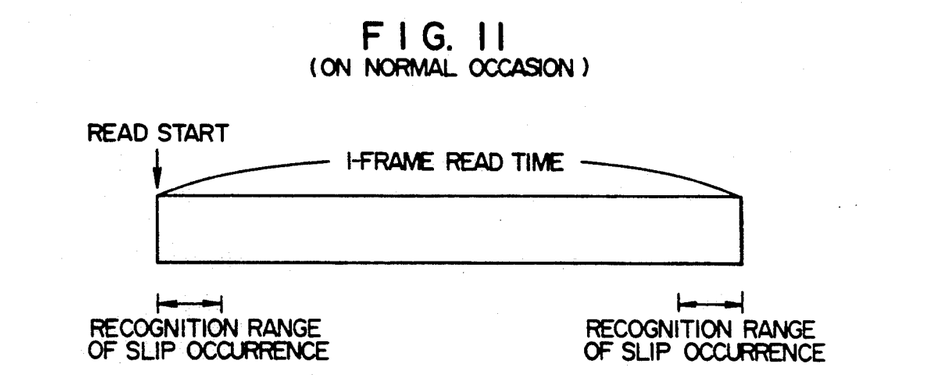
FIG. 11 is a diagram showing conditions for slip occurrence decision on normal occasions.

Also, the phase comparator 5 has two conditions for slip occurrence decision. They are shown in FIGS. 10 and 11. A recognition range of slip occurrence is set by the value of the read RAM counter 4 of the frame memory 1. In the case where the value of the RAM counter 4 is 0, it indicates a read start timing, so that if the writing is started at a time near to this value (the points indicated by arrow in FIGS. 10 and 11), it is decided that a slip has occurred. FIG. 10 shows a recognition range of slip occurrence for setting a new write start phase at the time of slip occurrence. By setting this range wider than the recognition range of slip occurrence under normal conditions shown in FIG. 11, a new write start phase is selected under stricter conditions thereby to produce a more stable condition.

The RAM counter 3 has stored therein only the two most significant bits of an address, and the two least significant bits of the value of the frame counter 10 are used as an address, as the two least significant bits of the address coincide with the type of frame. In the case where the sync pattern detection circuit 2 detects a sync pattern, the control section 6 sets an initial value in the RAM counter 3 by reference to the values of the individual phase memory 7 and the common phase memory 8. In this case, the initial value is only of two types including 00 and 10. Upon completion of writing data into the frame memory 1, unity (one) is added to the value of the RAM counter 3 (modulus 4).

The aforementioned operation executes the frame alignment by the multiplexing process while assuring TSSI.

Figure 15:
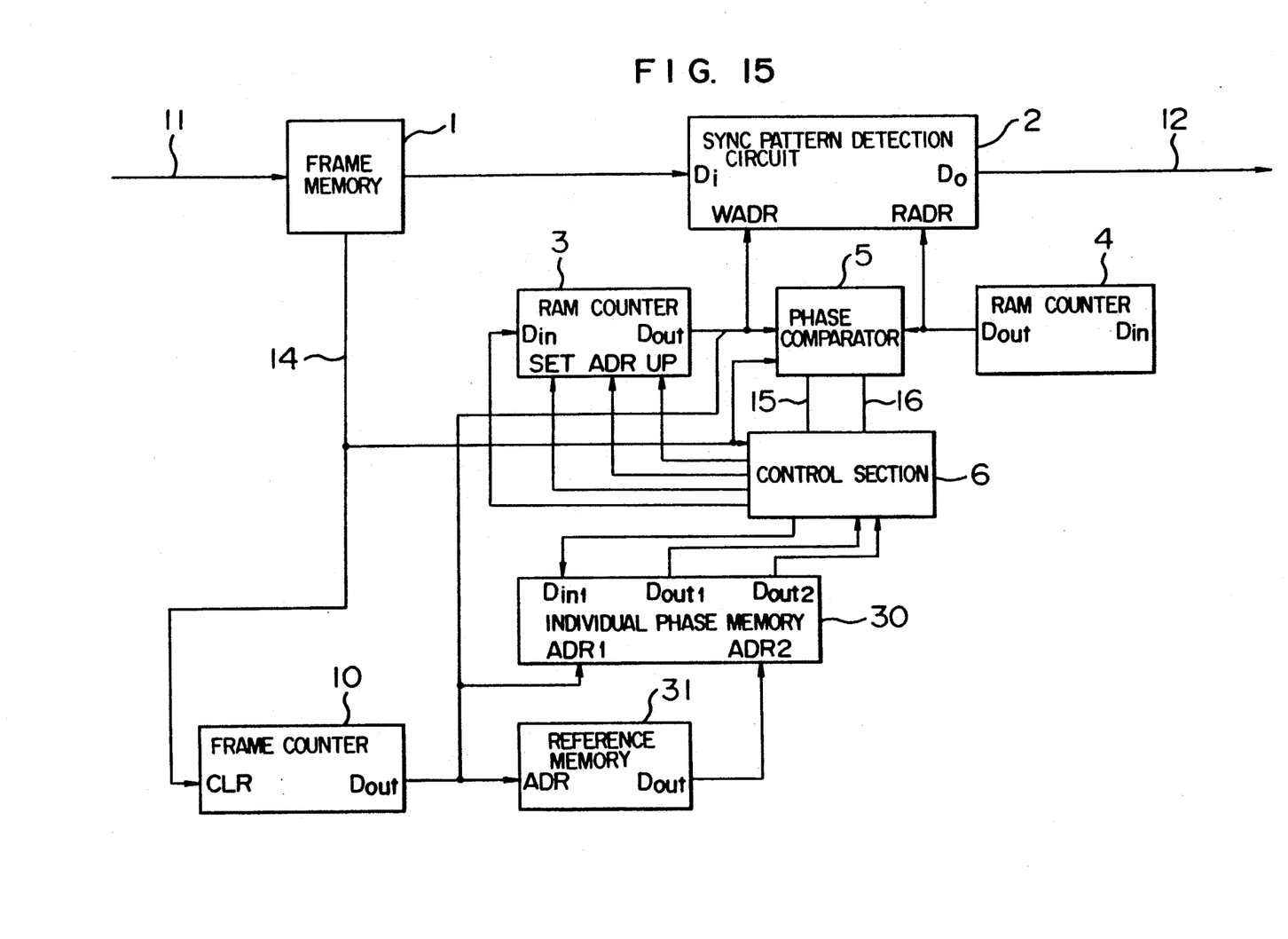
FIG. 15 is a diagram showing the second embodiment.

A second embodiment of the present invention will be explained with reference to FIG. 15. The frame aligner control circuit according to this embodiment is made up of a sync pattern detection circuit 2 for detecting a sync pattern of the data on the incoming highway 11, a frame memory 1 for storing the data on the incoming highway 11, a RAM counter 3 for storing an address for writing into the frame memory 1 of each low-speed frame, a RAM counter 4 for storing a read address, a phase comparator 5 for comparing the write and read phases to detect a slip, a control section 6, an individual phase memory 30 for storing the write start phase selected for each low-speed signal stored in a high-speed frame, an access memory 41 indicating a particular individual phase memory 30 to be accessed, and a frame counter 10. There exist four types of low-speed frame, A, B, C and D, as shown in FIG. 3, which are multiplexed in bytes and transmitted in that order. Each frame has a length of 4 bytes. Signals are assumed to be transmitted by being developed in eight parallels on the incoming highway 11. A sync pattern F1 (1 byte) is arranged at the head of the frame A, and a sync pattern F2 (1 byte) at the heads of the frames B, C and D, respectively, so that in the case where the sync pattern detection circuit detects Fl, the frame counter is cleared. The frame memory is constructed as shown in FIG. 2 and has a capacity equivalent to one low-speed frame. The write start phase is of four types including 0, 1, 2 and 3. The address of each block is as shown in the parentheses in FIG. 2 and ranges from 0000 to 1111. The two least significant bits of an address correspond to the type of each low-speed frame. Specifically, A is represented by 00, B by 01, C by 10 and D by 11.

Figure 13:
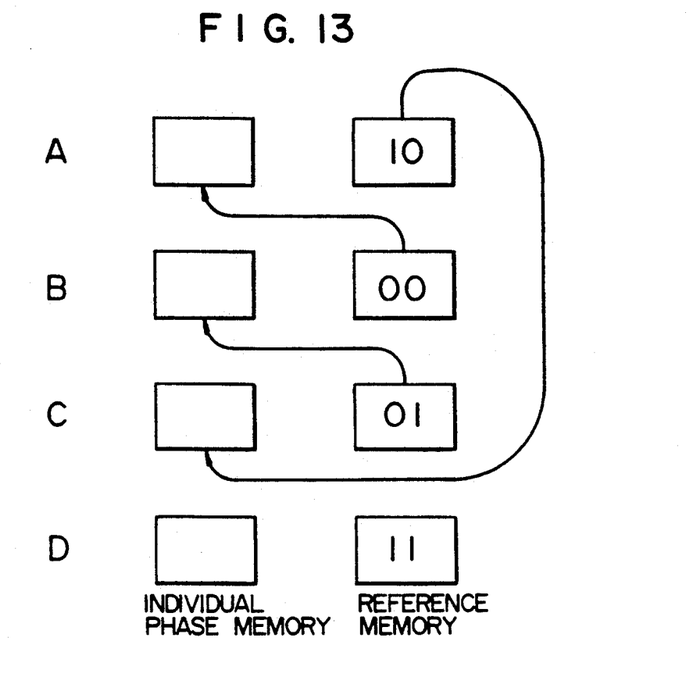
FIG. 13 is a diagram showing the state of each memory used for a second embodiment.

Now, assume a case in which of the low-speed frames A, B, C and D, TSSI is to be assured among A, B and C. In such a case, the access memories of A, B and C are set to designate mutually different mating memories. Specifically, as shown in FIG. 13, A is set to reference the individual phase memory 30 of C, B to reference that of A, and C to reference that of B. Assume that the frame of A is processed. In accordance with the value of the frame counter 10, the address for the frame A is applied to the individual phase memory 30 and the reference memory 31. And the output of the reference memory 31 is applied to the individual phase memory 30. As a result, the control section 6 can know the write start phase held by A at present and the write start phase of the mating memory (C in this case) to be referenced by A. The individual phase memory in this case is made up of a dual-port RAM. Further, the contents of the individual phase memory 30 are updated in accordance with the operation of FIG. 14 on the basis of the slip information detected by the phase comparator 5. Specifically, in the case where the value of own individual phase memory 30 is different from that of the mating individual phase memory 30, the value of the mating individual phase memory 30 is transferred to the own individual phase memory 30. Also, if a slip occurs, a new write start phase is selected and stored only in the own individual phase memory 30, even when the value of the own individual phase memory 30 coincides with that of the mating individual phase memory 30. In this way, a common reference phase is capable of being set between low-speed signals for which TSSI is assured, by designating the mating signal in chain among low-speed signals for which TSSI is to be assured.

In the manner as mentioned above, the frame alignment is executed by the multiplexing process while assuring TSSI by the operation described above.

Figure 12:
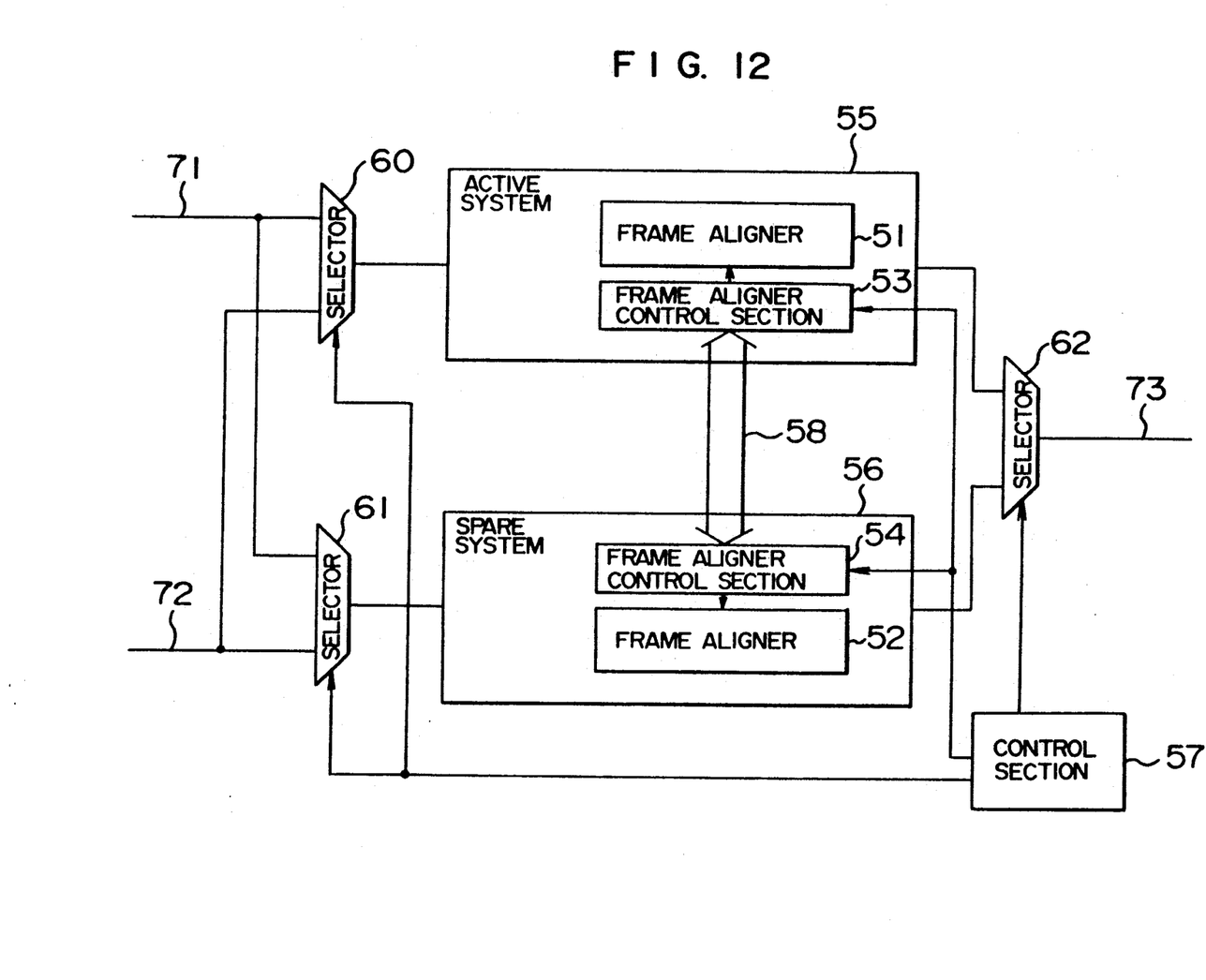
FIG. 12 is a diagram showing third and fourth embodiments.

A third embodiment of the present invention will be explained with reference to FIG. 12. In this embodiment, there exist one active system 55 and one spare system 56. The active system 55 has a frame aligner 51 and a frame aligner control section 53 therein, and the spare system 56 has a frame aligner 52 and a frame aligner control section 54 therein. A 0-system multiplexed signal 71 or a 1-system multiplexed signal 72 is selected as an input by a selector 60 or 61. The active system 55 or the spare system 56 is selected as an output by a selector 62. A control section 57 is for switching the selector 62 to the spare system side in case of a fault of the active system 55. At the same time, the control section 57 transfers the contents of the individual phase memory, the common phase memory and the identification memory in the frame aligner control section 53 in the active system 55 to the individual phase memory, the common phase memory and the identification memory respectively in the frame aligner control section 54 in the spare system 56.

The aforementioned operation realizes an uninterrupted instantaneous switching.

A fourth embodiment of the present invention will be explained with reference to FIG. 12. According to this embodiment, there exist one active system 55 and one spare system 56. The active system 55 has a frame aligner 51 and a frame aligner control section 53 existing therein, and the spare system 56 has a frame aligner 52 and a frame aligner control section 54 therein. A 0-system multiplexed signal 71 or a 1-system multiplexed signal 72 is selected as an input by a selector 60 or 61. The active system 55 or the spare system 56 is selected as an output by a selector 62. The control section 57 controls the contents of the individual phase memory, the common phase memory and the identification memory in the frame aligner control section 53 in the active system 55 into coincidence with the contents of the individual phase memory, the common phase memory and the identification memory respectively in the frame aligner control section 54 in the spare system 56.

The control section 57 switches the selector 62 to the spare system side in case of a fault of the active system 55.

The operation mentioned above realizes an uninterrupted instantaneous switching.

As will be understood from the foregoing description, according to the present invention, frames multiplexed by time division are capable of being effectively subjected to frame alignment by a multiplexing process.

We claim:

1. In a system for transmitting a plurality of low-speed signals having a frame structure in a high-speed frame by multiplexing the signals, a method of frame aligner control comprising the steps of:
    setting a plurality of candidates for a write start phase in a frame aligner memory; and
    selecting a write start phase for each of the candidates for write start phases set in said frame aligner memory by referencing a common phase memory which has stored therein write start phases shared by a plurality of low-speed signals requiring phase matching in the high-speed frame;
    wherein said selecting step includes the step of:
    referencing said common phase memory using address data stored in an identification memory, said address data indicating a particular one of said write start phases to be referenced.

2. A method of frame aligner control according to claim 1, further comprising the steps of:
    when it is decided that a slip has occurred due to the write phase attempting to overtake the read phase or the read phase attempting to overtake the write phase, switching a selection rule of a new write start phase.

3. A method of frame aligner control according to claim 2, wherein the object of selection under the selection rule of the write start phase is a write start phase immediately preceding the selected write start phase.

4. A method of frame aligner control according to claim 1, when it is decided that a slip has occurred due to the write phase attempting to overtake the read phase or the read phase attempting to overtake the write phase, switching a selection rule of a new write start phase.

5. A method of frame aligner control according to claim 4, wherein the object of selection under the selection rule of the write start phase is a write start phase immediately preceding the selected write start phase.

6. A method of frame aligner control according to claim 1, wherein the frame alignment is effected by a time-division multiplexing process.

7. A method of frame aligner control according to claim 1, wherein conditions for slip decision at the time of initialization are different from conditions for slip decision at a time other than the time of initialization.

8. A method of frame aligner control according to claim 1, wherein conditions for slip occurrence decision are provided in the frame aligner memory, one for each different type of low-speed signal, in the case where there are a plurality of types of low-speed signals.

9. A method of frame aligner control according to claim 1, further comprising the steps of:
when the frame aligner is of a redundant configuration such that one active system and at least one spare system are operated in parallel to each other, transferring contents of the common phase memory of the active system to the common phase memory of the spare system beforehand in switching from the active system to the spare system.

10. A method of frame aligner control according to claim 1, further comprising the steps of:
when the frame aligner is of a redundant configuration such that one active system and at least one spare system are operated in parallel to each other, always rendering contents of the common phase memory of the active system to coincide with the contents of the common phase memory of the spare system.

11. A method of frame aligner control according to claim 1, further comprising the steps of:
successively counting the number of slips occurring; and
issuing an alarm when the number of slips occurring successively exceeds a predetermined value.

12. A method of frame aligner control according to claim 1, further comprising the steps of:
successively counting the number of slips occurring; and
fixing the write start phase for the frame aligner memory when the number of slips occurring successively exceeds a predetermined value.

13. In a system for transmitting a plurality of low-speed signals having a frame structure in a high-speed frame by multiplexing the low-speed signals, a control system comprising:
a frame aligning memory for storing a plurality of candidates of write start phases;
individual phase memories, one for each low-speed signal stored in the high-speed frame, for storing a write start phase selected from the candidates of write start phases for the frame aligner memory;
reference memories, one for each low-speed signal, for indicating a particular individual phase memory to be referenced;
means for setting the reference memories in such a manner as to reference the individual phase memories of mutually-different mating ones of the low-speed signals requiring phase matching; and
means for transferring values of the referenced individual phase memories of mating low-speed signals to the individual phase memories of referencing side.

14. A frame aligner control system according to claim 13, wherein the frame alignment is effected by a multiplexing process.

15. A frame aligner control system according to claim 13, wherein conditions for slip decision at the time of initialization are different from those for slip decision on at a time other than the time of initialization.

16. A frame aligner control system according to claim 13, wherein when there are provided a plurality of types of low-speed signals, a condition for slip occurrence decision is provided in the frame aligner memory for each of different types of the signals.

17. A frame aligner control system according to claim 13, further comprising:
means for, when the frame aligner is of a redundant configuration such that one active system and at least one spare system are operated in parallel to each other, transferring contents of the individual phase memories of the active system to the individual phase memories of the spare system beforehand in switching from the active system to the spare system.

18. A frame aligner control system according to claim 13, further comprising:
means for rendering contents of the individual phase memories of the active system to always coincide with contents of the individual phase memories of the spare system when the frame aligner is of a redundant configuration such that one active system and at least one spare system are operated in parallel to each other.

19. A frame aligner control system according to claim 13, further comprising:
means for counting the number of slips occurring successively; and
means for issuing an alarm when the number of slips occurring successively exceeds a predetermined value.

20. A method according to claim 13, further comprising:
means for counting the number of slips occurring successively; and
means for fixing the write start phase of the frame aligner memory when the number of slips occurring successively exceeds a predetermined value.

21. In a system for transmitting a plurality of low-speed signals having a frame structure in a high-speed frame by multiplexing the low-speed signals, a frame aligner comprising:
a frame aligner memory for storing the low-speed signals;
a write counter for designating a write address of the frame aligner memory for each low-speed signal;
a read counter for designating a read address of the frame aligner memory for each low-speed signal;
a phase comparator for comparing the value of the read counter with that of the write counter thereby to detect the occurrence of a slip;
a first memory for storing a selected write start phase for each low-speed signal accommodated in the high-speed frame;

a second memory for storing a write start phase shared by a plurality of the low-speed signals requiring phase matching;
a third memory for indicating a particular second memory to be referenced; and
a circuit for selecting the phase of starting to write into the frame aligner memory in accordance with the result of comparison between the contents of the first memory and the second memory and the slip occurrence information detected by the phase comparator.

22. In a system for transmitting a plurality of low-speed signals having a frame structure in a high-speed frame by multiplexing the low-speed signals, a frame aligner comprising:
a frame aligner memory for storing the low-speed signals;
a write counter for designating a write address of the frame aligner memory for each low-speed signal;
a read counter for designating a read address of the frame aligner memory for each low-speed signal;
a phase comparator for detecting the occurrence of a slip by comparing the value of the read counter with that of the write counter;
a first memory for storing a write start phase for each low-speed signal stored in the high-speed frame;
a second memory for indicating a particular first memory among a plurality of low-speed signals requiring phase matching; and
a circuit for selecting a write start phase of the frame aligner memory in accordance with the slip occurrence information detected by the phase comparator and the result of comparing the contents of the first memory at an address allotted to a particular low-speed signal with the contents of the first memory at an address designated by the contents of the second memory at an address allotted to the particular low-speed signal.

* * * * *